(12) United States Patent
Matsukawa

(10) Patent No.: US 10,198,802 B2
(45) Date of Patent: Feb. 5, 2019

(54) MONITORING SYSTEM, PHOTOGRAPHY-SIDE DEVICE, AND VERIFICATION-SIDE DEVICE

(71) Applicant: Hitachi Kokusai Electric Inc., Tokyo (JP)

(72) Inventor: Tomoki Matsukawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 15/740,250

(22) PCT Filed: Jul. 1, 2015

(86) PCT No.: PCT/JP2015/069045
§ 371 (c)(1),
(2) Date: Dec. 27, 2017

(87) PCT Pub. No.: WO2017/002240
PCT Pub. Date: Jan. 5, 2017

(65) Prior Publication Data
US 2018/0189942 A1    Jul. 5, 2018

(51) Int. Cl.
*G06T 7/00* (2017.01)
*G06K 9/46* (2006.01)
(Continued)

(52) U.S. Cl.
CPC ............. *G06T 7/0002* (2013.01); *G06T 7/00* (2013.01); *H04N 7/18* (2013.01); *G06K 9/00268* (2013.01);
(Continued)

(58) Field of Classification Search
CPC ............. G06T 7/0002; G06T 2207/30; G06T 2207/30196; G06T 2207/30201;
(Continued)

(56) References Cited

U.S. PATENT DOCUMENTS 7,146,382 B2 * 12/2006 Yamamoto ........ G06F 17/30256
2008/0243395 A1 * 10/2008 Oosawa ................ G06F 19/321
702/19
(Continued)

FOREIGN PATENT DOCUMENTS

| JP | 2003-187352 A | 7/2003 |
|----|---------------|--------|
| JP | 2010-231402 A | 10/2010 |
| JP | 2013-153304 A | 8/2013 |
| WO | 2014/192248 A1 | 12/2014 |

OTHER PUBLICATIONS

Written Opinion of the International Searching Authoring for PCT/JP2015/069045 dated Sep. 1, 2015.
International Search Report of PCT/JP2015/069045 dated Sep. 1, 2015.

*Primary Examiner* — Jon Chang
(74) *Attorney, Agent, or Firm* — Mattingly & Malur, PC

(57) ABSTRACT

Provided is a monitoring system, comprising a imaging-side device, and a matching-side device which receives image data from the imaging-side device and matches the image data. The imaging-side device wirelessly transmits, to the matching-side device, feature value data which denotes feature of an image subject. Upon receiving the feature value data, and on the basis of the result of a comparison between the feature value data and feature value reference data, the matching-side device wirelessly transmits image data request information to the imaging-side device. Upon receiving the image data request information, the imaging-side device wirelessly transmits image data to the matching-side device.

15 Claims, 6 Drawing Sheets

(51) Int. Cl.
   *G06K 9/62*     (2006.01)
   *H04N 7/18*     (2006.01)
   *G06K 9/00*     (2006.01)

(52) U.S. Cl.
   CPC ............. *G06K 9/46* (2013.01); *G06K 9/6201* (2013.01); *G06T 2207/30* (2013.01)

(58) Field of Classification Search
   CPC .. G06K 9/00221; G06K 9/00268; G06K 9/46; G06K 9/6201; H04N 7/18
   See application file for complete search history.

(56)          References Cited

U.S. PATENT DOCUMENTS

| | | | |
|---|---|---|---|
| 2013/0182919 A1* | 7/2013 | Tanaka | G06K 9/00288 |
| | | | 382/118 |
| 2013/0243250 A1* | 9/2013 | France | G01C 15/00 |
| | | | 382/103 |
| 2014/0270408 A1* | 9/2014 | Hutchison, IV | G06F 21/32 |
| | | | 382/118 |
| 2014/0341444 A1* | 11/2014 | Hou | G06F 21/32 |
| | | | 382/118 |
| 2016/0012280 A1* | 1/2016 | Ito | G06K 9/00288 |
| | | | 382/305 |

* cited by examiner

F I G . 3
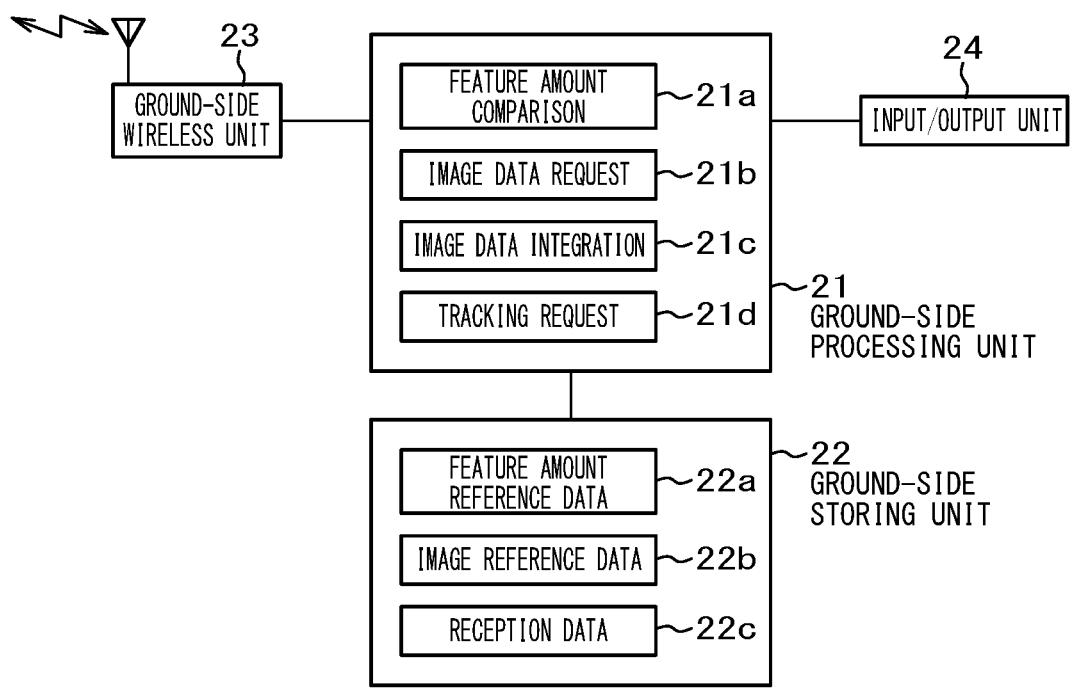
20 GROUND-SIDE DEVICE

MONITORING SYSTEM, PHOTOGRAPHY-SIDE DEVICE, AND VERIFICATION-SIDE DEVICE

TECHNICAL FIELD

The present invention relates to a monitoring technique of detecting a specific object from an image captured by a monitoring camera.

BACKGROUND ART

For example, in a similar face image retrieval for searching for a face image similar to an object to be monitored, there is a technique of calculating a feature amount of a human face from an image captured by a camera or an image recorded by a recorder, comparing the feature amount with a feature amount of a face image of an object to be monitored, and extracting a human face close to the face image of the object to be monitored as a candidate image.

In the case of performing such a similar face image retrieval by, for example, an in-train monitor system, an image captured by a monitoring camera (train-side equipment) in a train is transmitted to ground-side equipment. In the ground-side equipment, a feature amount of a human face is calculated from a received image. The feature amount is compared with a feature amount of a face image of an object to be monitored, and a human face close to the human image of the object to be monitored is extracted as a candidate image.

As means of the train-side equipment to communication with the ground-side equipment, a self-owned radio, a cellular phone network, WiFi (Wireless Fidelity) provided in stations, and the like are considered. Generally, a self-owned radio is used and, in an emergency, a cellular phone network is used. However, since a self-owned radio has a narrow communication band, it is a communication network unsuitable for communication of a large amount of data.

Therefore, in the background art, a captured image is divided into an arbitrary size in accordance with the bandwidth of a communication network, and divided images are sequentially transmitted. In such a manner, although it takes time, an image of a large data size can be transmitted. However, in this manner, since it takes long time to transmit an image captured by a monitoring camera in a train to ground-side equipment, only a small amount of images captured by the monitoring camera can be transmitted to the ground-side equipment. As a result, the performance of a monitoring system cannot be improved.

The following patent literature 1 describes a technique of matching a face image captured by a monitoring camera against face images stored in a database.

CITATION LIST

Patent Literature

PTL 1: Japanese Patent Application Laid-Open No. 2010-231402

SUMMARY OF INVENTION

Technical Problem

An object of the present invention is to provide a technique capable of efficiently matching a captured image against an image of an object to be monitored also when a communication band between an imaging-side device (for example, train-side equipment) and a matching-side device (for example, ground-side equipment) is narrow.

Solution to Problem

A representative configuration of a monitoring system of the invention of the present application for achieving the object is as follows. A monitoring system has an imaging-side device generating image data and a matching-side device receiving the image data from the imaging-side device and matching the image data, and is characterized in that the imaging-side device includes:

an imaging unit imaging an object and generating image data of the object;

an imaging-side processing unit generating feature amount data indicating a feature of the object on the basis of the image data generated by the imaging unit;

an imaging-side storing unit storing the feature amount data and image data corresponding to the feature amount data so as to be associated with each other; and an imaging-side wireless unit performing wireless communication with the matching-side device, the matching-side device includes:

a matching-side storing unit storing feature amount reference data to be compared with the feature amount data;

a matching-side processing unit comparing the feature amount data and the feature amount reference data; and a matching-side wireless unit performing wireless communication with the imaging-side device, the imaging-side device wirelessly transmits first feature amount data to the matching-side device, when the first feature amount data is received, based on a result of comparison between the received first feature amount data and the feature amount reference data, the matching-side device wirelessly transmits image data request information requesting transmission of first image data corresponding to the first feature amount data, and when the image data request information is received, the imaging-side device wirelessly transmits the first image data to the matching-side device.

A representative configuration of an imaging-side device of the invention of the present application is as follows. The imaging-side device includes:

an imaging unit imaging an object and generating image data of the object;

an imaging-side processing unit generating feature amount data indicating a feature of the object on the basis of the image data;

an imaging-side storing unit storing the feature amount data and image data corresponding to the feature amount data so as to be associated with each other; and an imaging-side wireless unit performing wireless communication with a matching-side device, and is characterized in that the feature amount data is wirelessly transmitted to the matching-side device, when image data request information requesting transmission of image data corresponding to the feature amount data is received from the matching-side device, image data corresponding to the feature amount data is wirelessly transmitted to the matching-side device.

A representative configuration of a matching-side device of the invention of the present application is as follows.

A matching-side device has:

a matching-side storing unit storing feature amount reference data to be compared with feature amount data generated by an imaging-side device and indicating a feature of an object;

a matching-side processing unit comparing the feature amount data and the feature amount reference data; and a matching-side wireless unit performing wireless communication with the imaging-side device, and is characterized in that when the feature amount data is received from the imaging-side device, based on a result of comparison between the received feature amount data and the feature amount reference data, image data request information requesting transmission of image data is wirelessly transmitted to the imaging-side device.

Advantageous Effects of Invention

According to the above-described configurations, match between a captured image and an image of an object to be monitored can be efficiently performed.

BRIEF DESCRIPTION OF DRAWINGS

FIG. 3 is a functional configuration diagram of a ground-side device according to the embodiment of the present invention.

DESCRIPTION OF EMBODIMENTS

Hereinbelow, an embodiment of the present invention will be described.

First, outline of the embodiment will be described.

In the embodiment, in a vehicle-side device 10 as an imaging-side device, an image of the inside of a train is captured by a camera provided in the train, feature amount data of a person (for example, feature amount data of a face) is extracted from the captured image data, and the extracted feature amount data is transmitted to a ground-side device 20 mounted on the ground which is the outside of the train. The captured image may be a still image or a moving image. In the case of capturing a moving image, feature amount data of a person is extracted from each of frames (that is, still images) of a captured moving image.

In the ground-side device 20 as the matching-side device, the received feature amount data and the feature amount data of an object to be monitored (feature amount data of the face of a person as an object to be monitored) stored in the ground-side device 20 are compared. When they are similar, the ground-side device 20 requests the vehicle-side device 10 for image data of the face (still image) and receives it from the vehicle-side device 10. Subsequently, the ground-side device 20 matches the received image data of the face against the image data of the face of the object to be monitored and determines whether the person of the face received is the person to be monitored or not. In the specification, it is assumed that similar feature amount data includes the same feature amount data.

As described above, when feature amount data of a face captured in a train is similar to feature amount data of the face of an object to be monitored, the image data of the face captured in the train is transmitted from the vehicle-side device 10 to the ground-side device 20, and when it is not similar, the image data is not transmitted. In such a manner, the data transmission amount from the vehicle-side device 10 to the ground-side device 20 can be suppressed. That is, a larger amount of the feature amount data of faces can be transmitted from the vehicle-side device 10 to the ground-side device 20.

Next, the configuration of a monitoring system of the embodiment will be described.

Figure 1:
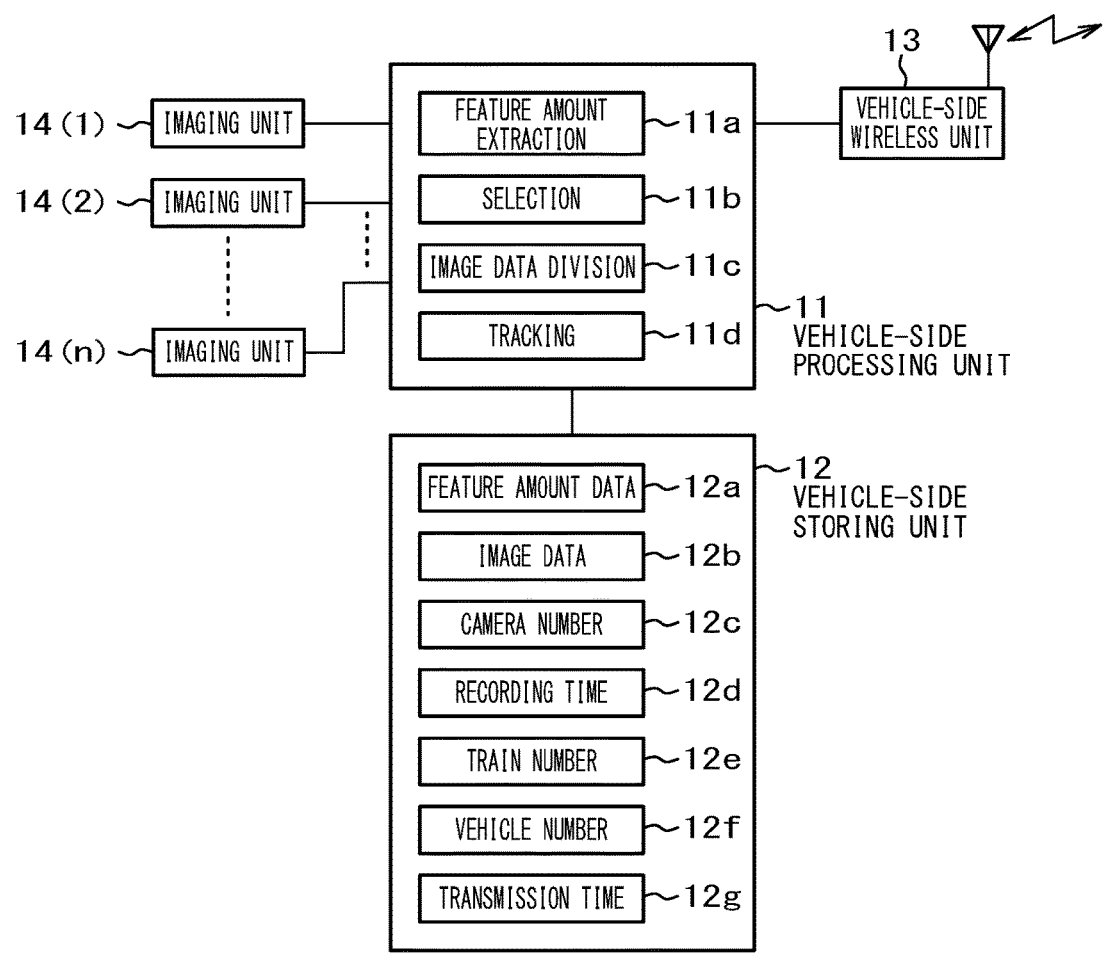
FIG. 1 is a functional configuration diagram of a vehicle-side device according to an embodiment of the present invention.

FIG. 1 is a functional configuration diagram of a vehicle-side device according to the embodiment of the present invention. The vehicle-side device 10 of the embodiment is mounted on a train made by a plurality of vehicles and is configured to include a vehicle-side processing unit 11, a vehicle-side storing unit 12, a vehicle-side wireless unit 13, and a plurality of image-capturing units 14. Each of the vehicle-side storing unit 12, the vehicle-side wireless unit 13, and the image-capturing units 14 is signal-connected to the vehicle-side processing unit 11 and controlled by the vehicle-side processing unit 11.

In FIG. 1, n pieces of image capturing units 14(1) to 14(n) are signal-connected to the vehicle-side processing unit 11. The n pieces of image capturing units 14(1) to 14(n) are mounted in a plurality of vehicles in the embodiment. In one vehicle, a plurality of image capturing units 14 are mounted for seats, aisles, doors, and the like. When the image capturing units 14(1) to 14(n) are generally called, they are called the image capturing unit 14.

The image capturing unit 14 is a camera having a CCD (Charge-Coupled Device) or the like for converting light to an electric signal, capturing an image of an object (for example, the face of a person), and generating image data of the object. In the embodiment, the image capturing unit 14 has a storing unit storing generated image data and, in response to a request from the vehicle-side processing unit 11, transmits image data stored in the storing unit to the vehicle-side processing unit 11. It is also possible to construct the image capturing unit 14 as a camera which does not have a storing unit and, each time image data is captured and generated, transmits the image data to the vehicle-side processing unit 11.

In the vehicle-side storing unit 12, a train number as an identifier specifying the train in which the vehicle-side device 10 is mounted, a vehicle number as an identifier specifying the vehicle in which the image capturing unit 14 is disposed, and a camera number as an identifier specifying the image capturing unit 14 are stored so as to be associated with one another. Specifically, the camera number of each of the imaging units 14 is stored so as to be associated with the vehicle number of the vehicle in which the imaging unit 14 is mounted and the train number of the train in which the imaging unit 14 is mounted. The train number and the vehicle number function as device numbers specifying the vehicle-side device 10 except for the imaging unit 14.

The vehicle-side processing unit 11 receives one still image as image data from the imaging unit 14, makes the image data associated with the time, the camera number, the vehicle number, and the train number, and stores the resultant data into the vehicle-side storing unit 12. As will be described later, the time, the camera number, the vehicle number, and the train number are used as image data specification information. The vehicle-side processing unit 11 extracts feature amount data from image data of faces of a plurality of persons in the stored image data of the one image, makes the data associated with the image data of the image from which the data is extracted, and stores the resultant data into the vehicle-side storing unit 12.

Next, the vehicle-side processing unit 11 transmits the feature amount data satisfying a predetermined selection condition (filtering condition) in the extracted feature amount data to the vehicle-side wireless unit 13, and wirelessly transmits it from the vehicle-side wireless unit 13 to the ground-side device 20. As the selection condition, for example, the feature amount data of the same person is not transmitted to the vehicle-side wireless unit 13 within most recent predetermined time. The details of the selection condition will be described later.

In response to a request from the ground-side device 20, the vehicle-side processing unit 11 wirelessly transmits the image data of the face captured to the ground-side device 20. In response to a request from the ground-side device 20, the vehicle-side processing unit 11 transmits a plurality of pieces of image data at different recording times of a person to be tracked. The details will be described later.

The vehicle-side processing unit 11 will be described in detail. In the embodiment, the vehicle-side processing unit 11 is configured so as to include a feature amount extraction unit 11a, a selection unit 11b, an image data division unit 11c, and a tracking unit 11d. The selection unit 11b, the image data dividing function of the image data division unit 11c, and the tracking unit 11d are not components necessary for the present invention, and part or all of them can be deleted.

The feature amount extraction unit 11a extracts feature amount data (for example, feature amount data of a face) indicating a feature amount which expresses a feature of a person from image data (for example, image data of a face) of a person captured by the imaging unit 14 and generates the data. The feature amount extraction unit 11a makes the generated feature amount data associated with image data corresponding to the feature amount data (that is, image data of the image from which the feature amount data is extracted) and the image data specification information specifying the image data, and stores the resultant data into the vehicle-side storing unit 12. The feature amount data of a face is obtained by, for example, measuring the positions or the like of eyes, nose, and mouth and quantifying them.

The feature amount extraction unit 11a may extract feature amount data as a feature of a person from image data of a part except for the face of the person, for example, image data of clothes, and store it together with the feature amount data of the face into the vehicle-side storing unit 12. The feature amount data of clothes is obtained by, for example, measuring the color and shape of clothes and quantifying them.

As illustrated in FIG. 1, in the embodiment, the feature amount extraction unit 11a stores, into the vehicle-side storing unit 12, feature amount 12a of a person, image data 12b of the person from which the feature amount 12a is extracted, a camera number 12c specifying the imaging unit 14 which captured the image data 12b, recording time 12d of the image data 12b, a train number 12e specifying a train in which the imaging unit 14 that captured the image data 12b is mounted, and a vehicle number 12f specifying a vehicle in which the imaging unit 14 that captured the image data 12b is disposed so as to be associated with one another.

Transmission time 12g is stored in the vehicle-side storing unit 12 by the selection unit 11b as will be described later.

As described above, the train number 12e, the vehicle number 12f, the camera number 12c, and the recording time 12d function as image data specification information specifying the image data 12b. In place of the train number 12e, the vehicle number 12f, the camera number 12c, and the recording time 12d, an image ID as an identifier specifying the image data 12b can be also used. The image ID can be constructed by, for example, a train number and a successive number given to each train. Although not illustrated in FIG. 1, by giving a feature amount ID as an identifier specifying feature amount data to each of feature amount data and storing it in association with the image data 12b into the vehicle-side storing unit 12, the feature amount ID can be used as image data specification information.

In the case where the imaging unit 14 captures a moving image, for each of frames of the captured moving image, the feature amount data 12a, the image data 12b, the camera number 12c, the recording time 12d, the train number 12e, the vehicle number 12f, and the transmission time 12g are associated with one another and stored into the vehicle-side storing unit 12.

The recording time 12d is information of time when the feature amount extraction unit 11a stores the image data 12b into the vehicle-side storing unit 12 and may include information of date. The recording time 12d may be time when the imaging unit 14 stores image data generated by imaging an object into the storing unit of the imaging unit 14. In this case, the imaging unit 14 transmits recording time information together with the image data to the vehicle-side processing unit 11.

The transmission time 12g is time when the feature amount data 12a is transmitted to the ground-side device 20. Alternatively, time when the selection unit 11b transmits the feature amount data 12a to the vehicle-side wireless unit 13 may be used. In the embodiment, as the transmission time 12g, time when the selection unit 11b transmits the feature amount data 12a to the vehicle-side wireless unit 13 is used.

The selection unit 11b selects the feature amount data 12a to be transmitted from the vehicle-side device 10 to the ground-side device 20 in the feature amount data 12a extracted by the feature amount extraction unit 11a, and transmits the selected feature amount data 12a and image data specification information corresponding to the selected feature amount data 12a to the vehicle-side wireless unit 13. The image data specification information corresponding to the feature amount data 12a is information specifying the image data 12b including the feature amount data 12a. The selection unit 11b stores, as the transmission time 12g, time when the feature amount data 12a is transmitted to the vehicle-side wireless unit 13 into the vehicle-side storing unit 12. As described above, the vehicle-side device 10 does not transmit all of feature amount data extracted from image data of a person imaged by the imaging unit 14 to the ground-side device 20 but performs filtering to choose the feature amount data satisfying a predetermined selection condition as feature amount data transmitted to the ground-side device 20.

The selection condition is that the feature amount data of the same person is not transmitted within most recent predetermined time, specifically, feature amount data approximate to feature amount data of an object to be selected is not transmitted within most recent predetermined time (for example, 30 seconds). In the specification, it is assumed that the approximate feature amount data includes the same feature amount data.

Figure 2:
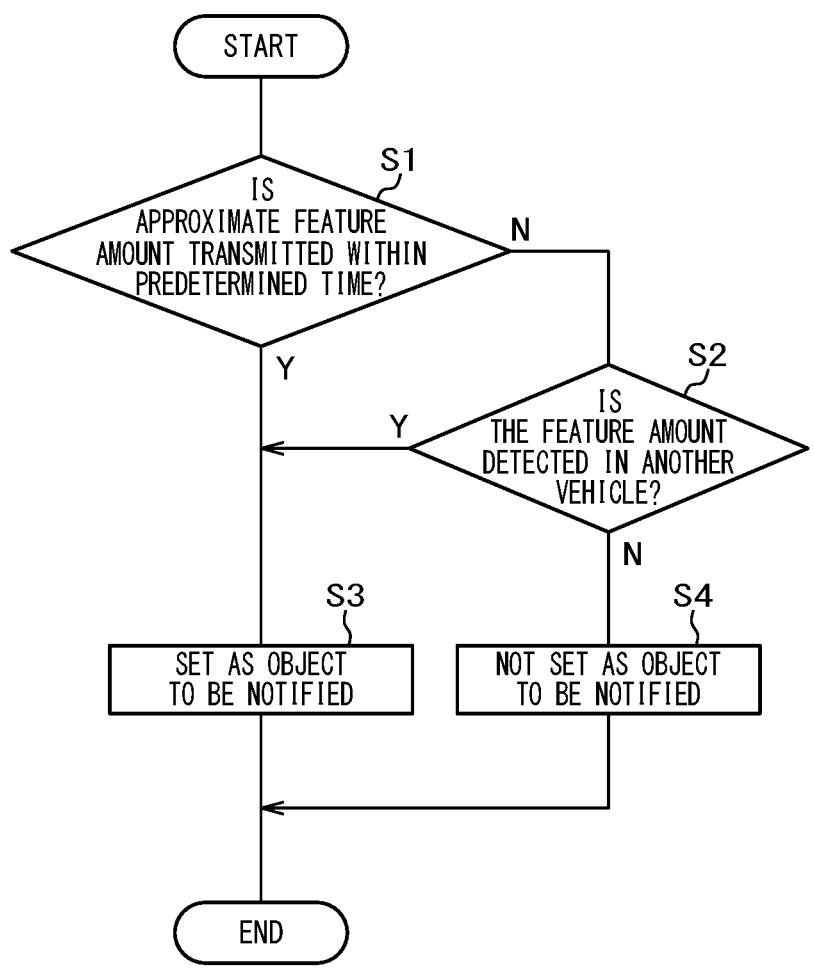
FIG. 2 is a diagram for explaining a selecting process according to the embodiment of the present invention.

FIG. 2 is a diagram for explaining a selecting process according to the embodiment of the present invention.

As illustrated in FIG. 2, when the selecting process starts, first, a first selection condition is checked (step S1 in FIG. 2).

The first selection condition is a temporal condition and is that approximate feature amount data is not transmitted to the ground-side device 20 (in the embodiment, not transmitted to the vehicle-side wireless unit 13) within most recent predetermined time. Concretely, the first selection condition is that, when feature amount data approximate to first feature amount data as an object to be selected was transmitted, time when the transmitted feature amount data was transmitted is not within most recent predetermined time, that is, the transmission time 12g corresponding to the transmitted feature amount data approximate to the first feature amount data of the object to be selected is not within predetermined time from present time when the selection unit 11b is performing selection.

In other words, the first selection condition is that the difference between first feature amount data as an object to be selected and transmitted feature amount data which is generated before the first feature amount data is generated is within a predetermined range and lapse time since the transmitted feature amount data is wirelessly transmitted to the ground-side device 20 (in the embodiment, transmitted to the vehicle-side wireless unit 13) is not within predetermined time.

Alternatively, the first selection condition can be set that the difference between time when transmitted feature amount data approximate to an object to be selected is stored in the vehicle-side storing unit 12 and time when the first feature amount data of an object to be selected is stored in the vehicle-side storing unit 12 is not within predetermined time. Such a case is also included in the first selection condition that the transmission time 12g corresponding to transmitted feature amount data approximate to the first feature amount data of an object to be selected is not within predetermined time from present time when the selection unit 11b is performing selection.

When the first selection condition is met (Yes in step S1), the feature amount data (the first feature amount data) to be selected by the selection unit 11b is set as an object to be notified, that is, an object to be transmitted to the ground-side device 20 (step S3). When the first selection condition is not met (No in step S1), a second selection condition is checked (step S2).

The second selection condition is a spatial condition and that places where feature amount data is detected are different. Concretely, image data from which transmitted feature amount data approximate to an object to be selected is captured in another vehicle, that is, the vehicle number 12f corresponding to the feature amount data (first feature amount data) of an object to be selected and the vehicle number 12f corresponding to the approximate transmitted feature amount data are different.

When the second selection condition is met (Yes in step S2), the feature amount data to be selected by the selection unit 11b is set as an object to be notified to the ground-side device 20 (step S3). When the second selection condition is not met (No in step S2), the feature amount data to be selected by the selection unit 11b is not set as an object to be notified to the ground-side device 20 (step S4).

In the embodiment, when one of the first and second selection conditions is satisfied, the feature amount data is transmitted to the ground-side device 20. That is, even when the first selection condition is not satisfied, when a first vehicle in which the imaging unit 14 that captured image data corresponding to the first feature amount data is disposed is different from a second vehicle in which the imaging unit 14 that captured image data corresponding to transmitted approximate feature amount data is disposed, the first feature amount data and the first image data specification information is wirelessly transmitted to the ground-side device 20. When the first and second vehicles are the same, the first feature amount data and the first image data specification information is not wirelessly transmitted to the ground-side device 20.

As described above, when feature amount data similar to each other is detected in different vehicles, the feature amount data similar to each other is determined as feature amount data of different persons and wirelessly transmitted to the ground-side device 20. Therefore, selection failure (that is, transmission failure) of feature amount data to be wirelessly transmitted can be suppressed.

As described above, by selecting feature amount data and transmitting it to the ground-side device 20, the communication amount of feature amount data to be transmitted from the vehicle-side device 10 to the ground-side device 20 can be suppressed. That is, a larger amount of different feature amount data can be transmitted from the vehicle-side device 10 to the ground-side device 20, and a larger number of persons can be monitored.

The image data division unit 11c transmits image data requested by the ground-side device 20 to be transmitted, to the ground-side device 20 via the vehicle-side wireless unit 13. On this occasion, the image data division unit 11c divides the image data into a plurality of pieces of image data and transmits them to the vehicle-side wireless unit 13. Specifically, when image data request information and image data specification information is received from the ground-side device 20, the image data division unit 11c takes image data corresponding to the image data specification information from the imaging-side storing unit 12, divides it into a plurality of pieces of image data, and wirelessly transmits them to the ground-side device 20. Since the data amount of the image data specification information is small, it is unnecessary to divide it.

By division-transmitting the image data, also when communication capacity at the time of transmitting data from the vehicle-side device 10 to the ground-side device 20 is small, image data of persons imaged by the imaging unit 14 can be transmitted to the ground-side device 20. When the communication capacity at the time of transmitting data from the vehicle-side device 10 to the ground-side device 20 is large, the image data dividing function of the image data division unit 11c may not be provided.

The image data division unit 11c can be also configured to divide image data of a person imaged by the imaging unit 14 into a plurality of pieces of image data at the time of storing the image data into the vehicle-side storing unit 12. In this case, the image data of the person imaged by the imaging unit 14 is stored into the vehicle-side storing unit 12 in a state where it is divided in a plurality of pieces of image data.

When tracking request information including feature amount data of an object to be tracked is received from the ground-side device 20 after the first image data is transmitted to the ground-side device 20, the tracking unit 11d retrieves and takes image data including feature amount data similar to the feature amount data of the object to be tracked in the image data newly stored in the vehicle-side storing unit 12 after the first image data is stored, and wirelessly transmits the taken image data together with the image data specification information to the ground-side device 20.

The tracking unit 11*d* repeats the operation (image data including feature amount data similar to an object to be tracked is retrieved, taken, and wirelessly transmitted to the ground-side device 20), thereby wirelessly transmitting a plurality of pieces of image data corresponding to the feature amount data similar to the feature amount data of the object to be tracked in order of recording time. In such a manner, a person having feature amount data similar to feature amount data of an object to be tracked is tracked, and the position and state of the person are monitored.

At this time, when the feature amount data of the object to be tracked is configured to include not only the feature amount data of a face but also the feature amount data of clothes, it becomes easy for the tracking unit 11*d* to retrieve image data including feature amount data similar to the feature amount data of the object to be tracked.

As described above, the vehicle-side storing unit 12 stores and accumulates the feature amount data 12*a* of a person, the image data 12*b* from which the feature amount data 12*a* is extracted, the image data specification information (the camera number 12*c* of the imaging unit 14 which captured the image data 12*b*, the recording time 12*d* of the image data 12*b*, the train number 12*e* of the train in which the imaging unit 14 that captured the image data 12*b* is mounted, and the vehicle number 12*f* of the vehicle in which the imaging unit 14 that captured the image data 12*b* is disposed), and the transmission time 12*g* so as to be associated with one another.

The imaging direction and the angle of view of the imaging unit 14 which captured the image data 12*b* may be stored in association with the camera number 12*c* into the vehicle-side storing unit 12. In such a manner, the place where the person as an object to be imaged can be specified more.

Since the amount of the feature amount data 12*a* and the related data (12*b* to 12*g*) becomes huge, in the embodiment, accumulation starts, for example, when a vehicle in which the vehicle-side device 10 is mounted departs from a departure point and reset when it arrives at the end point. For example, when a reset instruction from the ground-side device 20 is received by the vehicle-side device 10, the reset is executed by the vehicle-side processing unit 11 of the vehicle-side device 10 which received the reset instruction. The reset includes erasure of the data and regarding of the data as invalid data by the vehicle-side processing unit 11.

The vehicle-side wireless unit 13 performs wireless communication with the ground-side device 20. For example, when the feature amount data 12*a* of a person, the image data specification information, the image data 12*b*, or the like is received from the vehicle-side processing unit 11, the vehicle-side wireless unit 13 immediately wirelessly transmits it to the ground-side device 20. When the image data request information, the tracking request information, the tracking stop request information, or the like is received from the ground-side device, the vehicle-side wireless unit 13 immediately transmits it to the vehicle-side processing unit 11.

FIG. 3 is a functional configuration diagram of the ground-side device according to the embodiment of the present invention. The ground-side device 20 of the embodiment is configured to include a ground-side processing unit 21, a ground-side storing unit 22, a ground-side wireless unit 23, and an input/output unit 24. Each of the ground-side storing unit 22, the ground-side wireless unit 23, and the input/output unit 24 is signal-connected to the ground-side processing unit 21 and controlled by the ground-side processing unit 21.

The ground-side wireless unit 23 performs wireless communication with the vehicle-side device 10. For example, when the feature amount data 12*a* of a person, the image data specification information, and the image data 12*b* are received from the vehicle-side device 10, the ground-side wireless unit 23 immediately transmits it to the ground-side processing unit 21. When the image data request information, the tracking request information, or the tracking stop request information is received from the ground-side processing unit 21, the ground-side wireless unit 23 wirelessly transmits it to the vehicle-side device 10 immediately.

The input/output unit 24 has an input unit receiving an instruction from an operator (user) and an output unit outputting various information. The output unit includes a display unit such as an LCD (Liquid Crystal Display) and a sound output unit such as a speaker.

The ground-side storing unit 22 is configured to include feature amount reference data 22*a*, image reference data 22*b*, and reception data 22*c*.

The feature amount reference data 22*a* is reference data used for comparison with the feature amount data 12*a* which is wirelessly transmitted from the vehicle-side device 10 and is feature amount data of the face of a person to be monitored. The feature amount reference data 22*a* is supplied from the input/output unit 24 and stored or is extracted from image data (image reference data 22*b*) of a person supplied from the input/output unit 24 by the ground-side processing unit 21 and stored in the ground-side storing unit 22. A plurality of pieces of feature amount reference data 22*a* may exit.

The image reference data 22*b* is reference data used for comparison with the image data 12*b* wirelessly transmitted from the vehicle-side device 10 and is supplied from the input/output unit 24 and stored. The image reference data 22*b* is, for example, raw image data of a face which is not processed, of a person to be monitored. A plurality of pieces of image reference data 22*b* may exit.

The reception data 22*c* is configured to include a set or a plurality of sets each made of the feature amount data 12*a* wirelessly received from the vehicle-side device 10, the image data specification information corresponding to the feature amount data 12*a*, and the image data 12*b* specified by the image data specification information. As described above, in the embodiment, the image data specification information is the train number 12*e*, the vehicle number 12*f*, the camera number 12*c*, and the recording time 12*d*. The feature amount data 12*a*, the image data specification information, and the image data 12*b* constructing the above-described set is stored so as to be associated with one another.

When the feature amount data 12*a* received from the vehicle-side device 10 and the feature amount reference data 22*a* stored in the ground-side storing unit 22 is similar, the ground-side processing unit 21 displays the fact in the input/output unit 24. After that, when an image request for requesting the image data 12*b* corresponding to the feature amount data 12*a* is received by the input/output unit 24 from the operator (user), the ground-side processing unit 21 wirelessly transmits the image data request information and the image data specification information to the vehicle-side device 10. The ground-side processing unit 21 couples image data division-transmitted from the vehicle-side device 10 and displays the resultant data in the input/output unit 24.

The ground-side processing unit 21 displays the image data 12b and the image reference data 22b in the input/output unit 24 and, when a tracking instruction from the operator is received by the input/output unit 24, wirelessly transmits tracking request information including the feature amount data of an object to be tracked to the vehicle-side device 10. When a tracking stop instruction from the operator is received by the input/output unit 24, the ground-side processing unit 21 wirelessly transmits the tracking stop request information to the vehicle-side device 10.

When the tracking request information is received, as described above, the vehicle-side device 10 takes image data including feature amount data similar to feature amount data of an object to be tracked in image data newly stored in the vehicle-side storing unit 12 and wirelessly transmits the taken image data (image data for tracking) to the ground-side device 20. When the tracking stop request information is received, the vehicle-side device 10 stops wireless transmission of the image data for tracking.

Specifically, the ground-side processing unit 21 is configured to include a feature amount comparing unit 21a, an image data requesting unit 21b, an image data coupling unit 21c, and a track requesting unit 21d. The image data coupling function of the image data coupling unit 21c and the track requesting unit 21d are not components necessary for the present invention and can be deleted.

The feature amount comparing unit 21a compares the feature amount data 12a (specifically, feature amount data of the part of the face in the feature amount data 12a) received from the vehicle-side device 10 and the feature amount reference data 22a stored in the ground-side storing unit 22, and determines whether the difference is within a predetermined similarity range (first similarity range) or not (that is, whether the data is similar or not).

When the feature amount data 12a of a plurality of kinds related to a person A is compared with the feature mount reference data 22a and it is determined that the difference of the data lies within a predetermined similarity range (that is, the data is similar), the feature amount comparing unit 21a makes the feature amount data 12a and the image data specification information (the train number 12e, the vehicle number 12f, the camera number 12c, and the recording time 12d) corresponding to the feature amount data 12a associated with each other and stores it as the reception data 22c into the ground-side storing unit 22. The feature amount comparing unit 21a outputs the fact that the feature amount data 12a of the person A and the feature amount reference data 22a is similar by a video image, sound, or the like to the input/output unit 24.

In the determination of similarity between the feature amount data 12a of the person A and the feature amount reference data 22a, for example, when the feature amount reference data 22a is satisfied with respect to all of the feature amount data 12a of a plurality of kinds related to the person A, it can be determined that the data is similar. When the feature amount reference data 22a is satisfied with respect to, not all of the feature amount data 12a of the plurality of kinds, but specific important data, it can be also determined that the data is similar.

Next, an image request for requesting the image data 12b of the person A (that is, the image data 12b corresponding to the feature amount data 12a) is received by the input/output unit 24 from the operator. The image data requesting unit 21b wirelessly transmits the image data request information and the image data specification information specifying the image data 12b from the ground-side wireless unit 23 to the vehicle-side device 10.

It is also configured that, when the feature amount comparing unit 21a determines that the feature amount data 12a and the feature amount reference data 22a is similar, the image data requesting unit 21b automatically wirelessly transmits the image data request information and the image data specification information from the ground-side wireless unit 23 to the vehicle-side device 10. In such a configuration, the feature amount comparing unit 21a does not have to output the fact that the feature amount data 12a and the feature amount reference data 22a is similar to the input/output unit 24.

The image data requesting unit 21b may wirelessly transmit the image data request information and the image data specification information as physically separate information or wirelessly transmit it as physically one piece of information. In this case, for example, by wirelessly transmitting image data specification information, the meaning of an image request is included in the image data specification information. That is, the image data specification information also serves as image data request information.

The image data coupling unit 21c couples the image data 12b division-transmitted from the vehicle-side device 10 to restore it, displays the restored data in the input/output unit 24, and stores, as the reception data 22c, the image data 12b restored by the coupling so as to be associated with image data specification information specifying the image data 12b into the ground-side storing unit 22. Preferably, the image data coupling unit 21c displays the image data 12b received from the vehicle-side device 10 and the image reference data 22b on the same screen.

Preferably, the image data coupling unit 21c displays the image data specification information together with the image data 12b. Since the image data specification information includes the train number 12e, the vehicle number 12f, the camera number 12c, and the recording time 12d, when and where the person captured in the image data 12b existed can be known.

When a tracking instruction from the operator is received by the input/output unit 24 in a state where the image data 12b received from the vehicle-side device 10 is displayed, the tracking requesting unit 21d extracts feature amount data of a person to be tracked from the image data 12b being displayed, and wirelessly transmits tracking request information including the extracted feature amount data to the vehicle-side device 10. When a tracking stop instruction is received from the operator by the input/output unit 24 during tracking process, the track requesting unit 21d wirelessly transmits the tracking stop request information to the vehicle-side device 10.

Each of the imaging unit 14, the vehicle-side processing unit 11, the vehicle-side wireless unit 13, the ground-side wireless unit 23, the ground-side processing unit 21, and the input/output unit 24 can be configured by, for example, a CPU (Central Processing Unit) and a memory storing an operation program and the like. The CPU operates according to the operation program.

The vehicle-side storing unit 12 and the ground-side storing unit 22 are constructed by a semiconductor memory (flash memory, RAM (Random Access Memory), ROM (Read Only Memory), or the like), a magnetic disk, or the like.

FIRST EXAMPLE

Figure 4:
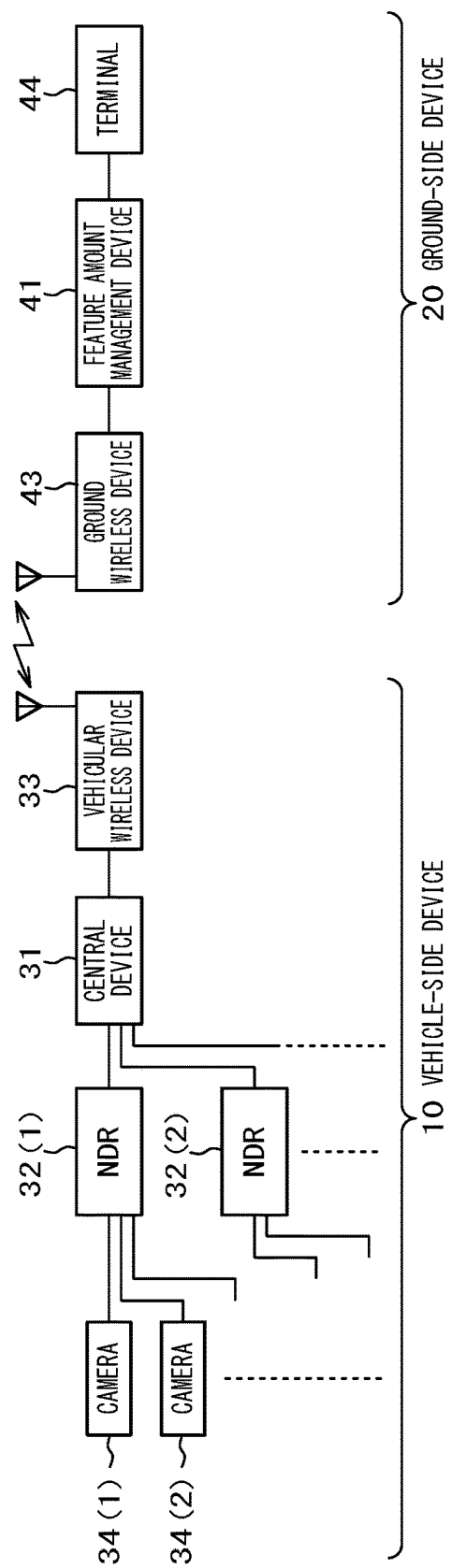
FIG. 4 is a device configuration diagram of a monitoring system according to a first example of the embodiment of the present invention.

Next, a first example in the embodiment will be described. FIG. 4 is a device configuration diagram of a monitoring system according to the first example.

As illustrated in FIG. 4, in the first example, the monitoring system is configured to include the vehicle-side device 10 and the ground-side device 20. The vehicle-side device 10 of the first example is mounted on a train made by a plurality of vehicles and configured to include a plurality of cameras 34(1), 34(2), . . . , a plurality of NDR (Network Digital Recorders) 32(1), 32(2), . . . , one central device 31, and one vehicular wireless device 33. The cameras 34(1), 34(2), . . . are also generally called the camera 34. The NDRs 32(1), 32(2), . . . are also generally called the NDR 32.

A plurality of cameras 34 are disposed in each vehicle and are signal-connected to the NDRs 32 by wire. The camera 34 can be also wirelessly connected to the NDR 32. The camera 34 is an imaging device imaging an object, generating image data of the object, and extracting feature amount data from the generated image data. The camera 34 associates the generated image data with feature amount data, stores the resultant data in a storing unit of the camera 34 and, in response to a request from the NDR 32, transmits the data to the NDR 32.

In such a manner, the camera 34 of the first example serves as the imaging unit 14 in FIG. 1 and a part of the vehicle-side processing unit 11 (the feature amount extraction unit 11a).

One NDR 32 is disposed in each vehicle and signal-connected to the plurality of cameras 34 and the central device 31 disposed in the vehicle by wire. Alternatively, the NDR 32 can be wirelessly connected to the cameras 34 and the central device 31. When image data and feature amount data generated by the camera 34 is received, the NDR 32 stores the received image data and feature amount data into the storing unit of the NDR 32 and transmits it to the central device 31.

At the time of storing image data and feature amount data received from the camera 34 into the storing unit of the NDR 32, the NDR 32 stores the data so as to be associated with image data specification information (train number 12e, vehicle number 12f, camera number 12c, and recording time 12d) specifying the image data.

That is, the NDR 32 stores the feature amount data 12 of a person, the image data 12b of the person from which the feature amount data 12a is extracted, the camera number 12c of the camera 34 which captured the image data 12b, the recording time 12d of the image data 12b, the train number 12e of the train in which the camera 34 that captured the image data 12b is mounted, and the vehicle number 12f of the vehicle in which the camera 34 that captured the image data 12b is disposed so as to be associated with one another.

It is also possible to construct as follows. The NDR 32 stores the feature amount data 12a, the image data 12b, the camera number 12c, and the recording time 12d so as to be associated with one another. The central device 31 stores the train number 12e and the vehicle number 12f so as to be associated with the feature amount data 12a.

The recording time 12d may be time when image data captured and generated by a camera 34 is stored in the storing unit of the camera 34, or time when an NDR 32 stores the image data 12b into the storing unit of the NDR 32.

The NDR 32 transmits feature amount data received from the camera 34 and the image data specification information (train number 12e, vehicle number 12f, camera number 12c, and recording time 12d) corresponding to the feature amount data to the central device 31.

As described above, the NDR 32 of the first example has the function (function of writing and reading various data) of a part of the vehicle-side processing unit 11 in FIG. 1 and the function (of storing the data except for the transmission time 12g) of a part of the vehicle-side storing unit 12. That is, the NDR 32 serves as the vehicle-side processing unit 11 and the vehicle-side storing unit 12 in FIG. 1.

The central device 31 is signal-connected to the vehicular wireless device 33 by wire and is signal-connected to the NDR 32 disposed in each vehicle by wire. The central device 31 stores the feature amount data 12a received from the NDR 32 and the image data specification information (train number 12e, vehicle number 12f, camera number 12c, and recording time 12d) into the storing unit of the central device 31. The central device 31 selects the feature amount data 12a to be wirelessly transmitted to the ground-side device 20 and wirelessly transmits the selected feature amount data 12a and the image data specification information to the ground-side device 20 via the vehicular wireless device 33. The selection condition is as described in the explanation of the selection unit 11b. The central device 31 stores time when the feature amount data 12a is transmitted to the vehicular wireless device 33 as the transmission time 12g so as to be associated with the transmitted feature amount data 12a into the storing unit of the central device 31.

When an image data transmission request is received from the ground-side device 20, that is, when image data request information and image data specification information is received from the ground-side device 20, the central device 31 reads image data specified by the received image data specification information from the NDR 32, divides it into a plurality of pieces of data, and transmits them together with the image data specification information to the vehicular wireless device 33.

The vehicular wireless device 33 performs operation similar to that of the vehicle-side wireless unit 13 in FIG. 1. That is, the vehicular wireless device 33, for example, wirelessly transmits the feature amount data 12a of a person, the image data specification information, the image data 12b, and the like received from the central device 31 to the ground-side device 20. The vehicular wireless device 33 receives image data request information and the like wirelessly transmitted from the ground-side device 20 and transmits it to the vehicle-side processing unit 11.

As described above, the central device 31 of the first example has the functions (the feature amount data selecting function and the image data dividing function) of a part of the vehicle-side processing unit 11 in FIG. 1 and the function of the vehicle-side storing unit 12. That is, the central device 31 serves as the vehicle-side processing unit 11 and the vehicle-side storing unit 12 in FIG. 1. The vehicular wireless device 33 serves as the vehicle-side wireless unit 13 in FIG. 1.

In such a manner, in the first example, the function of the imaging unit 14 in FIG. 1 is constructed by a part of the camera 34, the functions of the vehicle-side processing unit 11 and the vehicle-side storing unit 12 in FIG. 1 are constructed by a part of the camera 34, the NDR 32, and the central device 31, and the function of the vehicle-side wireless unit 13 in FIG. 1 is constructed by the vehicular wireless device 33. As described above, each of the vehicle-side processing unit 11 and the vehicle-side storing unit 12 may be constructed by a plurality of devices. The vehicle-side wireless unit 13 in FIG. 1 may be also constructed by a plurality of devices.

As illustrated in FIG. 4, the ground-side device 20 of the first example is configured to include a ground wireless device 43, a feature value management device 41, and a terminal 44. The feature value management device 41 is signal-connected to each of the ground wireless device 43 and the terminal 44 by wire. Alternatively, the feature value management device 41 can be wirelessly connected to each of the ground wireless device 43 and the terminal 44.

The ground wireless device 43 performs wireless communication with the vehicle-side device 10 and serves as the ground-side wireless unit 23 in FIG. 3. For example, the ground wireless device 43 receives the feature amount data 12a, the image data 12b, and the like wirelessly transmitted from the vehicle-side device 10 and transmits it to the feature value management device 41. The ground wireless device 43 wirelessly transmits image data request information and the like received from the feature value management device 41 to the vehicle-side device 10.

The terminal 44 has an input unit receiving an instruction from the operator and an output unit outputting various information. The output unit includes a display unit such as an LCD and a sound output unit such as a speaker.

The feature value management device 41 serves as the ground-side processing unit 21 and the ground-side storing unit 22 in FIG. 3. Like the ground-side storing unit 22, the feature value management device 41 is configured to include the feature amount reference data 22a, the image reference data 22b, and the reception data 22c.

The feature amount reference data 22a is, as described above, reference data used for comparison with the feature amount data 12a wirelessly transmitted from the vehicle-side device 10, is received from the terminal 44, and stored. Alternatively, the feature amount reference data 22a is extracted from image data (image reference data 22b) of a face supplied from the terminal 44 by the feature value management device 41, and is stored in the feature value management device 41.

As described above, the image reference data 22b is reference data used for comparison with the image data 12b wirelessly transmitted from the vehicle-side device 10, and is supplied from the terminal 44 and stored.

As described above, the reception data 22c is configured to include a set or a plurality of sets each made by feature amount data 12 wirelessly transmitted from the vehicle-side device 10, image data specification information corresponding to the feature amount data 12a, and image data 12b specified by the image data specification information.

Like the ground-side processing unit 21, the feature value management device 41 compares the feature amount data 12a of a face received from the vehicle-side device 10 and the feature amount reference data 22a stored in the feature value management device 41 and, when the difference lies within a predetermined range, displays the fact that the feature amount data 12a and the feature amount reference data 22a is similar in the terminal 44, and stores, as the reception data 22c, the feature amount data 12a and the image data specification information corresponding to the feature amount data 12a into the feature value management device 41.

When an image request for requesting the image data 12b corresponding to the feature amount data 12a is received from the operator by the terminal 44, the feature value management device 41 transmits the image request from the ground wireless device 43 to the vehicle-side device 10. The feature value management device 41 couples the image data 12b which is division-transmitted from the vehicle-side device and displays the resultant data in the terminal 44.

In such a manner, in the first example, the functions of the ground-side processing unit 21 and the ground-side storing unit 22 in FIG. 3 are performed by the feature value management device 41, the function of the ground-side wireless unit 23 is performed by the ground wireless device 43, and the function of the input/output unit 24 is performed by the terminal 44. As described above, the ground-side processing unit 21 and the ground-side storing unit 22 in FIG. 3 may be constructed by a single device.

As a hardware configuration, each of the camera 34, the NDR 32, the central device 31, the vehicular wireless device 33, the ground wireless device 43, the feature value management device 41, and the terminal 44 has a CPU (Central Processing Unit) and a memory storing an operation program and the like, and the CPU operates according to the operation program.

Figure 5:
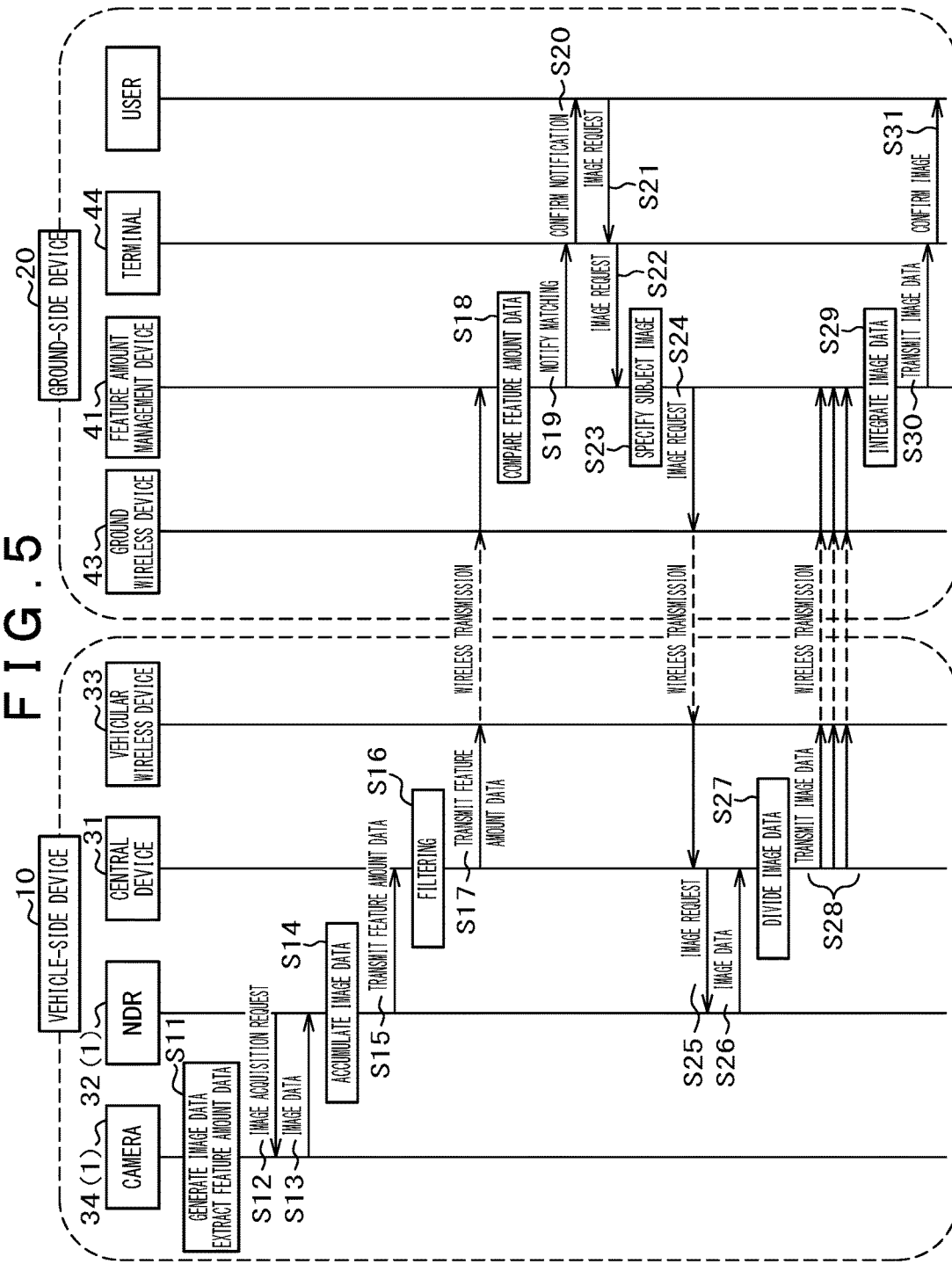
FIG. 5 is a matching sequence chart according to the first example of the embodiment of the present invention.

Next, a matching sequence in the first example is described. FIG. 5 is a matching sequence chart according to the first example.

First, for example, the camera 34(1) cyclically images the inside of a vehicle, generates image data, and extracts feature amount data from the generated image data (step S11 in FIG. 5). The camera 34(1) associates the generated image data with feature amount data and stores the resultant in the storing unit of the camera 34(1). The imaging interval of imaging the inside of a vehicle and generating image data can be set to, for example, five seconds. The camera 34 stores the generated image data and the feature amount data in the storing unit of the camera 34 until the data is transmitted to the NDR 32.

For example, when the faces of four persons A, B, C, and D are captured in one piece of image data, the camera 34(1) extracts feature amount data of A, B, C, and D as feature amount data (A), feature amount data (B), feature amount data (C), and feature amount data (D), respectively from the one piece of image data and stores it so as to be associated with the image data into the storing unit of the camera 34(1).

The NDR 32(1), for example cyclically, sequentially transmits an image data acquisition request for a plurality of cameras 34 coupled to the NDR 32(1) (step S12), sequentially receives and obtains the image data and the feature amount data stored in the cameras 34 (step S13), and stores and accumulates it in the storing unit of the NDR 32(1) (step S14). At this time, the NDR 32(1) stores and accumulates, together with image data and feature amount data, image data specification information (train number 12e, vehicle number 12f, camera number 12c, and recording time 12d) specifying the image data in the storing unit of the NDR 32(1).

For example, the NDR 32(1) obtains, from the camera 34(1), one piece of image data in which images of four persons A, B, C, and D are captured and four pieces of feature amount data of A, B, C, and D (feature amount data (A), feature amount data (B), feature amount data (C), and feature amount data (D)), makes the image data and the feature amount data associated with each other, and stores image data specification information specifying the image data into the storing unit of the NDR 32(1).

The interval of transmitting an image data acquisition request from the NDR 32 to the camera 34, that is, the interval of obtaining image data and feature amount data from the camera 34 can be set to, for example, about 10 seconds. The image data acquisition interval is equal to or longer than the above-described imaging interval of the camera 34.

The NDR 32(1) transmits the feature amount data obtained from each of the cameras 34 or the feature amount data accumulated in the storing unit of the NDR 32(1) to the central device 31 together with image data specification information corresponding to the feature amount data (step S15). Each time feature amount data included in one piece of image data is obtained from the camera 34, the NDR 32 transmits the obtained feature amount data to the central device 31. After the NDR 32 obtains a plurality of pieces of feature amount data included in a plurality of pieces of image data, the NDR 32 may transmit the plurality of pieces of feature amount data obtained to the central device 31 in a lump.

For example, the NDR 32(1) transmits the feature amount data (A), (B), (C) and (D) extracted from one piece of image data together with image data specification information corresponding to the four pieces of feature amount data to the central device 31.

The central device 31 receives feature amount data and image data specification information from a plurality of NDRs 32 connected to the central device 31 and stores it into the storing unit of the central device 31. The central device 31 performs the above-described selecting process (filtering) (step S16) and wirelessly transmits the selected feature amount data to the ground-side device 20 via the vehicular wireless device 33 (step S17). At this time, the central device 31 wirelessly transmits one piece of image data to the ground-side device each time the selected feature amount data is generated. The central device 31 may wirelessly transmit the selected feature amount data piece by piece to the ground-side device 20 or wirelessly transmit feature amount data regarding a plurality of pieces of image data to the ground-side device 20 in a lump. At this time, the central device 31 wirelessly transmits selected feature amount data and also image data specification information corresponding to the selected feature amount data to the ground-side device 20.

For example, the central device 31 selects feature amount data (A), feature amount data (B), and feature amount data (C) from the feature amount data (A), (B), (C), and (D) corresponding to one piece of image data obtained from the camera 34(1), and wirelessly transmits it together with one piece of image data specification information corresponding to the feature amount data (A), (B), and (C) to the ground-side device 20 via the vehicular wireless device 33.

When feature amount data and image data specification information corresponding to the feature amount data is received via the ground wireless device 43, the feature value management device 41 of the ground-side device 20 stores the received feature amount data and image data specification information to the storing unit of the feature value management device 41.

The feature amount management device 41 compares and matches the received feature amount data (or stored feature amount data) with/against feature amount reference data stored in the storing unit of the feature value management device 41 (step S18). When there is feature amount data similar to the feature amount reference data in the feature amount data received from the vehicle-side device 10, a matching notification indicating similarity is sent to the terminal 44 (step S19).

For example, when any of the feature amount data (A), (B), and (C) received from the vehicle-side device 10 is similar to the feature amount reference data, for example, when the feature amount data (A) and (B) is similar to the feature amount reference data (A) and (B) of the persons A and B, respectively, the feature value management device 41 sends a matching notification that the feature amount data (A) and (B) is similar to the feature amount reference data to the terminal 44.

By outputting the content of the matching notification by display, sound, or the like, the terminal 44 makes the user recognize it by the notification (that is, the operator of the terminal 44) (step S20). When the user who recognizes it by notification sends an image request requesting image data corresponding to the feature amount data (A) and (B) to the terminal 44 (step S21), the terminal 44 transmits the image request to the feature value management device 41 (step S22).

When the image request corresponding to the feature amount data (A) and (B) is received from the terminal 44, the feature value management device 41 extracts and takes the image data specification information corresponding to the feature amount data (A) and (B) from the storing unit of the feature value management device 41 (step S23). The feature value management device 41 wirelessly transmits the taken image data specification information and image data request information requesting transmission of image data to the vehicle-side device 10 via the ground wireless device 43 (step S24). Preferably, in the image data request information, feature amount data (feature amount data (A) and (B)) designated as similar data by the user is included.

When image data request information and image data specification information is received from the ground-side device 20 via the vehicle wireless device 33, the central device 31 analyzes the received image data specification information and determines whether the received image data request information is addressed to the vehicle-side device 10 including the central device 31. Concretely, when the train number 12e included in the image data specification information received from the ground-side device 20 matches the train number of the train in which the center device 31 is mounted, it is determined that the information is addressed to the vehicle-side device 10.

When the train number matches, the center device 31 determines the NDR 32 of the address of the image data request information by the vehicle number 12f included in the received image data specification information. The center device 31 transfers the received image data request information and the image data specification information to the NDR 32 of the address (step S25).

When the image data request information and image data specification information is received from the center device 31, the NDR 31(1) specifies the image data 12b to be transmitted to the ground-side device 20 on the basis of the received image data specification information. Concretely, the NDR 32(1) specifies the image data 12b to be transmitted to the ground-side device 20 on the basis of the camera number 12c and the recording time 12d of the image data specification information. The NDR 32(1) takes the specified image data 12b from the storing unit of the NDR 32(1) and transmits the read image data 12b and the image data specification information to the center device 31 (step S26). For example, the NDR 32(1) transmits one piece of image data 12b in which the faces of four persons A, B, C, and D are captured and the image data specification information to the central device 31.

Preferably, the NDR 32(1) takes feature amount data (feature amount data (A) and (B)) designated as similar data by the ground-side device 20 from the image data request information and puts a mark indicating similarity to an object corresponding to the feature amount data designated as similar data. For example, it is preferable to put a mark such as a circle on each of the faces of the persons A and B corresponding to the feature amount data (A) and (B) in one piece of image data 12b in which the faces of the four persons A, B, C, and D are captured. Since the marks are displayed together with the image data in the terminal 44, persons to be noted are easily recognized by the user.

The central device 31 divides the image data 12b received from the NDR 32(1) into, for example, three pieces (step S27) and wirelessly transmits them together with the image data specification information to the ground-side device 20 via the vehicular wireless device 33 (step S28).

As described above, when a request to transmit the image data of the faces of A and B is received from the ground-side device 20, one piece of image data in which the faces of the four persons A, B, C, and D are captured is not transmitted as it is to the ground-side device 20, but image data of the face of A and image data of the face of B may be extracted from one piece of image data in which the faces of the four persons A, B, C, and D are captured and transmitted to the ground-side device 20. However, by transmitting one piece of image data in which the faces of the four persons A, B, C, and D as it is, the time of the image data extracting process can be omitted.

When the image data specification information and the divided image data 12*b* is received, for example, in three times via the ground wireless device 43, the feature value management device 41 couples the divided image data 12*b* into one piece of data (step S29) and transmits the data together with the image data specification information to the terminal 44 (step S30).

By displaying the coupled image data 12*b* and the image (the image reference data 22*b*) of a person to be monitored, for example, on the same screen, the terminal 44 makes the user check the images (step S31). Preferably, the terminal 44 displays image data specification information together with the image data 12*b*. In such a manner, the user can recognize the train and the vehicle in which the person in the image data 12*b* exists and the camera which captured the image data.

When it is determined that the person in the image data 12*b* is the person to be monitored, as necessary, the user tracks the position of the person in the image data 12*b* by, for example, a tracking sequence of a second example.

Although feature amount data is extracted by the camera 34 in the above-described first example, it can be configured that feature amount data is extracted by the NDR 32 or the central device 31.

In the first example, as the feature amount data transmitted to the ground-side device 20, only feature amount data of a face may be used and feature amount data of clothes may be excluded. In a second example to be described later, preferably, the feature amount data transmitted to the ground-side device 20 includes not only the feature amount data of a face but also the feature amount data of clothes.

Although a plurality of vehicles, a plurality of NDR 32, and a plurality of cameras 34 are provided in the first example, it can be also configured to provide one vehicle, one NDR 32, and one camera 34.

According to the first example, at least the following effects are produced.

(A1) An imaging-side device (vehicle-side device) wirelessly transmits first feature amount data and first image data specification information corresponding to the first feature amount data to a matching-side device (ground-side device), when the difference between the first feature amount data and the feature amount reference data lies in a first similarity range, the matching-side device wirelessly transmits image data request information and first image data specification information to the imaging-side device, and the imaging-side device wirelessly transmits first image data specified by the first image data specification information to the matching-side device. Therefore, matching between a captured image and an image of an object to be monitored can be efficiently made. By managing feature amount reference data in an integrated manner by the matching-side device, the imaging-side device does not have to manage feature amount reference data, so that feature amount reference data can be easily updated.

(A2) When the difference between transmitted feature amount data which is wirelessly transmitted before first feature amount data is wirelessly transmitted and the first feature amount data lies in a predetermined range and lapse time since the transmitted feature amount data was wirelessly transmitted to the matching-side device is equal to or less than predetermined time, the first feature amount data and the first image data specification information is not wirelessly transmitted to the matching-side device. Consequently, the communication amount of feature amount data transmitted from the vehicle-side device to the ground-side device can be suppressed.

(A3) In the case where the difference between the transmitted feature amount data and first feature amount data lies in a predetermined range and the lapse time is equal to or less than predetermined time, when a first vehicle in which an imaging unit that captured first image data corresponding to the first feature amount data is disposed is the same as a second vehicle in which the imaging unit that captured image data corresponding to the transmitted feature amount data is disposed, the first feature amount data and the first image data specification information is not wirelessly transmitted to the matching-side device. When the first and second vehicles are different from each other, the first feature amount data and the first image data specification information is wirelessly transmitted. Therefore, when feature amount data similar to each other is detected in different vehicles, it is determined that the feature amount data similar to each other is feature amount data of different persons, and the data can be wirelessly transmitted to the matching-side device. That is, transmission failure of feature amount data to be wirelessly transmitted can be suppressed.

(A4) When the difference between first feature amount data and feature amount reference data lies in a first similarity range, the matching-side device displays the fact in the output unit. When an image request from the operator is received by the input unit, image data request information and first image data specification information is wirelessly transmitted to the imaging-side device. Therefore, by determination of the operator, an image request can be made to the imaging-side device.

(A5) When the difference between first feature amount data and feature amount reference data lies within a first similarity range, the matching-side device automatically wirelessly transmits image data request information and first image data specification information to the imaging-side device. Therefore, even without involvement of an operator, an image request can be sent to the imaging-side device.

(A6) The imaging-side device divides image data into a plurality of pieces of image data and wirelessly transmits them to the matching-side device, and the matching-side device couples the received image data and displays the coupled image data. Consequently, also when communication capacity at the time of transmitting image data from the imaging-side device to the matching-side device is small, image data can be transmitted to the matching-side device.

(A7) Since image data specification information includes a device number specifying the imaging-side device other than the imaging unit, an imaging unit number specifying the imaging unit, and recording time indicating time when image data is stored, the image data specification information can be simply configured. In the matching-side device, by the image data specification information, when and where a person captured in the image data existed can be known.

(A8) In the case where a plurality of objects exist in one piece of image data, when the difference between any of a plurality of pieces of feature amount data included in first feature amount data and feature amount reference data lies in a first similarity range, the matching-side device wirelessly transmits image data request information and image data specification information to the imaging-side device. Consequently, the present invention can be applied also when there are a plurality of objects in one piece of image data.

(A9) Since the imaging-side device is configured to put a mark indicating similarity to an object corresponding to feature amount data in image data before the image data is wirelessly transmitted to the matching-side device, a person to be noted can be displayed so as to be easily recognized by an operator

SECOND EXAMPLE

Figure 6:
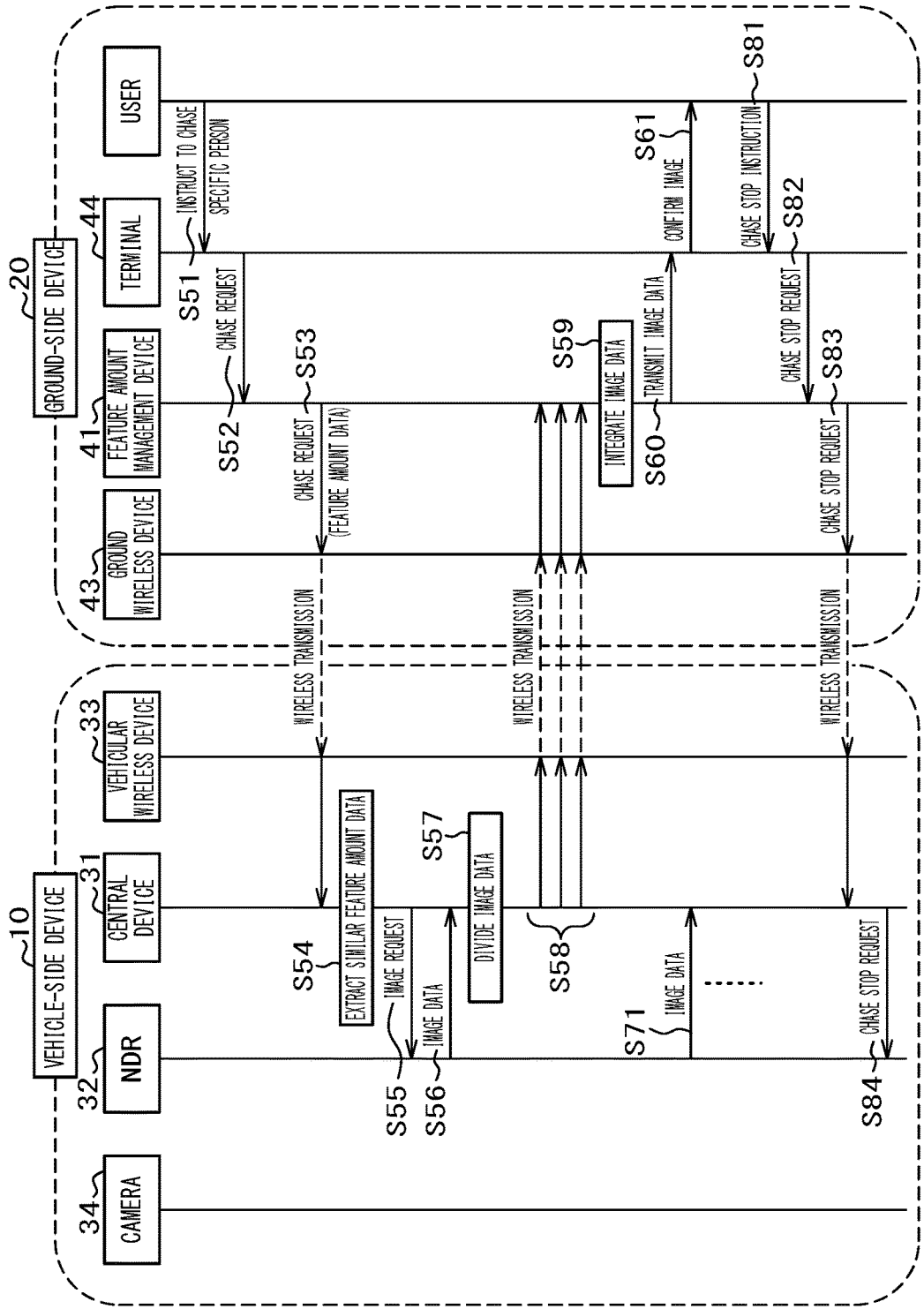
FIG. 6 is a tracking sequence chart according to a second example of the embodiment of the present invention.

Next, as a second example in the embodiment, a track sequence of tracking a person whose image is matched in the ground-side device 20 in the first example will be described. FIG. 6 is a tracking sequence chart according to the second example, and illustrates a sequence successive to the matching sequence of the first example. The second example may be executed subsequent to the first example or may be executed singularly regardless of the first example.

The device configuration of a monitoring system according to the second example is substantially similar to the device configuration (FIG. 4) of the monitoring system according to the first example. In the monitoring system of the second example, in addition of the functions of the monitoring system of the first example, the vehicle-side device 10 has the above-described function of the tracking unit 11*d*, and the ground-side device 20 has the above-described function of the tracking requesting unit 21*d*.

First, as described in the step S31 (FIG. 5) of the first example, in a state where first image data received from the vehicle-side device 10 and an image of a person to be monitored (image reference data 22*b*) is displayed in the same screen in the terminal 44, the user makes an image check. When the user determines that the person in the first image data displayed is the same as the person to be monitored, the user specifies the person in the first image data and sends a request to track the person to the terminal 44 (step S51).

For example, when the faces of four persons A, B, C, and D are captured in first image data displayed in the terminal 44, the user specifies the two persons A and B and sends an instruction to track A and B to the terminal 44. A and B can be specified by using a mouse or a touch panel on the display screen of the terminal 44 by a known technique. Then, the terminal 44 transmits a tracking request including specification information of A and B to the feature value management device 41 (step S52).

When the tracking request is received from the terminal 44, based on the received tracking request, the feature value management device 41 extracts the feature amount data of persons to be tracked (the feature amount data (A) as the feature amount data of A and the feature amount data (B) as the feature amount data of B) from feature amount data (feature amount data of A, B, C, and D) corresponding to first data transmitted to the terminal 44 (that is, the most recent image data displayed in the terminal 44). The feature value management device 41 generates tracking request information including the feature amount data of objects to be tracked (the feature amount data (A) and (B)), that is, generates tracking request information specifying the feature amount data of objects to be tracked, and wirelessly transmits the generated tracking request information to the vehicle-side device 10 via the ground wireless device 43 (step S53).

When the tracking request information is received from the ground-side device 20 via the vehicular wireless device 33, based on the received tracking request information, the central device 31 retrieves and extracts second feature amount data similar to the feature amount data (the feature amount data (A) or (B)) of the object to be tracked and corresponding to second image data of recording time newer than recording time of the first image data from feature amount data accumulated in the storing unit of the central device 31 (step S54). That is, the central device 31 extracts second feature amount data whose difference from the feature amount data of the object to be tracked is within a second similarity range and newer than the feature amount data of the object to be tracked. There may be a plurality of pieces of second image data and a plurality of pieces of second feature amount data.

The second similarity range is preferably narrower than the first similarity range stated in the description of the feature amount comparing unit 21*a*. Since the first similarity range is used for comparison between the feature amount data 12*a* received from the vehicle-side device 10 and the feature amount reference data 22*a*, the similarity range is set relatively wide. The reason is, since the date of capturing image data from which the feature amount data 12*a* is extracted and the date of capturing image data from which the feature amount reference data 22*a* is extracted are different, the degree of similarity is relatively low. On the other hand, the second similarity range is used for comparison between feature amount data of an object to be tracked and the second feature amount data.

The date of capturing image data from which the feature amount data of the object to be tracked is extracted and the date of capturing image data from which the second feature amount data is extracted are the same (or close), so that the degree of similarity is naturally high. Therefore, by making the second similarity range narrower than the first similarity range, a person to be tracked can be accurately tracked. That is, tracking of a person slightly similar to a person to be tracked can be suppressed.

For example, the central device 31 extracts feature amount data a1 and a2 similar to the feature amount data (A) and feature amount data b1 similar to the feature amount data (B) from the storing unit of the central device 31. The feature amount data a1, a2, and b1 is second feature amount data corresponding to second image data of recording time newer than the recording time of the first image data.

Subsequently, the central device 31 generates image request information including the extracted feature amount data a1, a2, and b1 and transmits the generated image request information to the NDRs 32 of vehicles (step S55).

When the image request information including the feature amount data a1, a2, and b1 is received, based on the received image request information, the NDR 32 of each vehicle extracts image data corresponding to the feature amount data a1, a2, or b1 from image data accumulated in the storing unit of the NDR 32 and transmits it to the central device 31 (step S56). At this time, the NDR 32 of each vehicle transmits image data specification information (train number 12e, vehicle number 12f, camera number 12c, and recording time 12d) specifying each image data together with image data to the central device 31.

For example, the NDR 32 of a vehicle A extracts image data ga1 corresponding to the feature amount data a1 and image data ga2 corresponding to the feature amount data a2 and transmits it together with image data specification information specifying the image data to the central device 31. The NDR 32 of a vehicle B extracts image data gb1 corresponding to the feature amount data b1 and transmits it together with image data specification information specifying the image data to the central device 31.

The central device 31 divides each of the image data received from the NDRs 32 (step S57) and wirelessly transmits the divided data together with the image data specification information received from the NDRs 32 to the ground-side device 20 via the vehicular wireless device 33 (step S58).

When the image data specification information and the divided image data is received via the ground wireless device 43, the feature value management device 41 couples the divided image data so as to obtain the image before division (step S59) and transmits the coupled image data and the image data specification information to the terminal 44 (step S60).

The terminal 44 displays the coupled image data and the image data specification information (train number 12e, vehicle number 12f, camera number 12c, and recording time 12d) specifying the image data, for example, on the same screen, thereby making the user check the image (step S61). The user can know the train, the vehicle, the position, and the time in which the person to be tracked existed from the train number 12e, the vehicle number 12f, the camera number 12c, and the recording time 12d.

After predetermined time since the image data was transmitted to the central device 31 in step S56, the NDR 32 of each vehicle extracts image data including feature amount data similar to the feature amount data of the object to be tracked and transmits it to the central device 31 (step S71). That is, after the image data is extracted in step S56, the NDR 32 extracts image data corresponding to the feature amount data a1, a2, or b1 from the image data newly accumulated in the storing unit of each NDR 32 and transmits it together with the image data specification information corresponding to the feature amount data to the central device 31.

When the image data is received in step S71, the central device 31 and the ground-side device 20 perform processes similar to those in steps S57 to S61. The NDRs 32 of the vehicles repeat the process similar to that of step S71 every predetermined time, and the central device 31 and the ground-side device 20 repeat the processes similar to those of steps S57 to S61 every predetermined time.

The interval of repeatedly transmitting the image data from the vehicle-side device 10 to the ground-side device 20 in step S58 is, for example, one second and shorter than the interval (for example, five seconds) of transmitting the image data from the camera 34 to the NDR 32 in step S13. In such a manner, the position and state of the object to be tracked can be monitored more specifically.

After that, when a tracking stop instruction from the user is received by the terminal 44 (step S81), the terminal 44 transmits a tracking stop request to stop a tracking process which is being executed to the feature value management device 41 (step S82).

When the tracking stop request is received from the terminal 44, the feature value management device 41 generates tracking stop request information on the basis of the received tracking stop request and wirelessly transmits the generated tracking stop request information to the vehicle-side device 10 via the ground wireless device 43 (step S83).

When the tracking stop request information is received from the ground-side device 20 via the vehicular wireless device 33, the central device 31 transmits the received tracking stop request information to the NDRs 32 of the vehicles (step S84).

When the tracking stop request information is received, the NDRs 32 of the vehicles stop a similar image extracting process and a transmitting process being executed on the basis of the received tracking stop request information.

As described above, in the second example, in the ground-side device 20, first image data is displayed in the terminal 44 and, when a tracking instruction from the operator is received by the terminal 44, tracking request information including the feature amount data of the object to be tracked is wirelessly transmitted. In the vehicle-side device 10, when the tracking request information is received from the ground-side device 20, second feature amount data whose difference from the feature amount data of the object to be tracked is within a second similarity range and corresponding to second image data (the recording time of the second image data is newer than that of the first image data) is extracted from the feature amount data stored in the vehicle-side device 10, and second image data corresponding to the second feature amount data is wirelessly transmitted together with corresponding image data specification information to the ground-side device 20.

After lapse of predetermined time since then, the vehicle-side device 10 extracts third feature amount data whose difference from the feature amount data of the object to be tracked is within a second similarity range and corresponding to third image data (the recording time of the third image data is newer than that of the second image data), and wirelessly transmits the third image data corresponding to the third feature amount data together with corresponding image data specification information to the ground-side device 20. In such a manner, image data similar to an object to be tracked and newly recorded is wirelessly transmitted to the ground-side device 20 a plurality of times.

As described above, without repeating an instruction from the ground-side device 20, new image data similar to an object to be tracked is repeatedly wirelessly transmitted from the vehicle-side device 10 to the ground-side device 20, so that the position and state of the object to be tracked can be monitored easily.

In the second example, preferably, feature amount data includes feature amount data of a face and feature amount data of clothes. In such a manner, at the time of retrieving feature amount data similar to feature amount data of a person to be tracked, the central device 31 can use not only the feature amount data of a face but also the feature amount data of clothes. Therefore, it becomes easier for the central device 31 to extract feature amount data similar to that of an object to be tracked.

In the above-described second example, based on tracking request information from the ground-side device 20, the central device 31 extracts similar feature amount data which is similar feature amount data of an object to be tracked, and transmits it to the NDR 32, and the NDR 32 extracts image data corresponding to the similar feature amount data. Alternatively, it can be also configured that the NDR 32 extracts similar feature amount data and extracts image data corresponding to the extracted similar feature amount data.

In the above-described second example, the NDR 32 extracts image data corresponding to similar feature amount data. Alternatively, it can be also configured that similar feature amount data is transmitted from the NDR 32 to the camera 34, and image data corresponding to the similar feature amount data is captured by the camera 34 and transmitted to the central device 31 via the NDR 32.

In the above-described second example, in step S53, tracking request information including feature amount data (feature amount data (A) and (B)) of an object to be tracked is generated by the feature value management device 41 and wirelessly transmitted to the vehicle-side device 10. Alternatively, it can be also configured that, based on image data specification information corresponding to feature amount data of an object to be tracked, the camera number of the camera 34 which captured the feature amount data of the object to be tracked is specified, and track request information including the specified camera number is generated by the feature value management device 41 and wirelessly transmitted to the vehicle-side device 10.

In this case, the central device 31 transmits tracking request information to the camera 34 of the specified camera number via the NDR 32. When the tracking request information is received from the central device 31, the camera 34 captures images at frequency higher than that in normal time (step S11), generates image data, and transmits the image data to the NDR 32. When the track request information is received from the central device 31, the NDR 32 sends an image acquisition request at frequency higher than that in normal time (step S12), obtains image data from the camera 34, and transmits the image data to the central device 31. In such a manner, the position and the state of an object to be tracked can be frequently monitored.

In the case of using a feature amount ID for specifically feature amount data as image data specification information, in tracking request information transmitted from the feature value management device 41 in S53 in FIG. 6, the feature amount ID is used in place of the feature amount data. As a feature amount ID, anything such as numbers sequentially given or identification information based on time such as transmission time and feature amount extraction time may be used as long as it can specify feature amount data. By the above, also when the faces of a plurality of persons are captured in image data, it becomes possible to manage to track the feature amount of a specific person by the feature amount ID, and the data amount can be reduced more in the case of using feature amount data as tracking request information.

Although the central device 31 and the NDR 32 are different devices in the above-described second example, it can be also configured to make the central device 31 and the NDR 32 as one device. The one device has the functions of the central device 31 and the NDR 32.

In the above-described second example, the case where the faces of a plurality of persons are captured in the image data 12b displayed in the terminal 44 has been described. Also to the case where the face of one person is captured in the image data 12b displayed in the terminal 44, the tracking sequence of the second example can be applied. This case will be described later as a third example.

According to the second example, at least the following effects are produced.

(B1) A matching-side device displays first image data received from an imaging-side device and image reference data and, when a tracking request from an operator is received, wirelessly transmits tracking request information specifying feature amount data of an object to be tracked to the imaging-side device. When the tracking request information is received, the imaging-side device extracts second feature amount data whose difference from the feature amount data of the object to be tracked is within a second similarity range and corresponding to second image data of recording time newer than the first image data and wirelessly transmits second image data corresponding to the second feature amount data to the matching-side device. Consequently, the position and the state of an object to be tracked can be monitored.

(B2) An imaging-side device is mounted in a train, and a plurality of imaging units exist and are disposed in a plurality of vehicles constructing a train. At the time of wirelessly transmitting the second image data, the imaging-side device wirelessly transmits a vehicle number specifying a vehicle in which an imaging unit that generated the second image data is disposed to the matching-side device, after that, extracts third feature amount data whose different from the feature amount data of an object to be tracked is within a second similarity range and corresponding to third image data at recording time newer than the second image data, and wirelessly transmits third image data corresponding to the third feature amount data and the vehicle number of a vehicle in which an imaging unit that generated the third image data is disposed to the matching-side device. Therefore, the vehicle in which the object to be tracked exists and the state of the object to be tracked can be easily known. Even when the imaging direction and the view angle of an imaging unit are fixed, by using a plurality of imaging units disposed in vehicles, tracking can be performed.

(B3) Since the second similarity range is set to be narrower than the first similarity range used for comparison between feature amount data received from the imaging-side device and the feature amount reference data, a person to be tracked can be accurately tracked. That is, tracking of a person slightly similar to an object to be tracked can be suppressed.

(B4) An interval since an imaging-side device wirelessly transmits the second image data until it wirelessly transmits the third image data is set to be shorter than an interval that the imaging-side device wirelessly transmits first image data, so that the position and the state of an object to be tracked can be monitored more specifically.

(B5) Since the feature amount data includes feature amount data of the face of a person and feature amount data of clothes, it becomes easier to retrieve image data including feature amount data similar to feature amount data of an object to be tracked.

(B6) In the case of using a feature amount ID for specifying feature amount data as image data specification information and transmitting the feature amount ID in place of feature amount data as tracking request information, even when the faces of a plurality of persons are captured in image data, the feature amount of each person can be specified by a feature amount ID. The data amount can be reduced as compared with the case of using feature amount data for tracking request information.

THIRD EXAMPLE

A third example in the embodiment is the case where the number of persons captured in image data displayed in the terminal 44 is one in the second example. Since the other configuration and sequence are similar to those of the second example, description will be given by using FIG. 6 of the second example.

In the second example, tracking request information including feature amount data of an object to be tracked is used as tracking request information specifying feature amount data of an object to be tracked and wirelessly transmitted from the feature value management device 41. In the third example, as tracking request information specifying feature amount data of an object to be tracked, tracking request information including feature amount data of an object to be tracked or tracking request information including image data specification information can be used. An example of using track request information including image data specification information will be described here. The reason why tracking request information including image data specification information can be used is because feature amount data and image data corresponds to each other in a one-on-one manner (that is, only one person is captured in image data).

First, when the user determines that a person A in first image data received from the vehicle-side device 10 is the same as a person to be monitored, the user sends a request to track the person A to the terminal 44 (step S51 in FIG. 6).

The terminal 44 transmits a tracking request including specification information of the person A to the feature value management device 41 (step S52). Based on the tracking request received from the terminal 44, the feature value management device 41 wirelessly transmits tracking request information including the image data specification information as tracking request information specifying the feature amount data (A) of the object A to be tracked to the vehicle-side device 10 (step S53).

Based on the image data specification information received from the feature value management device 41, the central device 31 extracts the feature amount data (A) corresponding to the image data specification information. Based on the extracted feature amount data (A), the central device 31 extracts feature amount data (a) similar to the feature amount data (A) and stored more recently than the feature amount data (A) from feature amount data accumulated in the storing unit of the central device 31 (step S54). The central device 31 transmits image request information including the extracted feature amount data (a) to the NDR 32 of each vehicle (step S55).

When image request information is received from the central device 31, the NDR 32 in each vehicle extracts image data corresponding to the feature amount data (a) included in the image request information from the storing unit of the NDR 32 and transmits it together with image data specification information to the central device 31 (step S56).

The central device 31 wirelessly transmits the image data and the image data specification information received from the NDR 32 to the ground-side device 20 (step S58). The ground-side device 20 displays the image data and the image data specification information (train number 12*e*, vehicle number 12*f*, camera number 12*c*, and recording time 12*d*) received from the central device 31 in the terminal 44 (step S60)

As described above, in the third example, in the ground-side device 20, when a tracking instruction from an operator is received by the terminal 44 in a state where first image data is displayed in the terminal 44, as tracking request information specifying feature amount data of an object to be tracked, tracking request information including image data specification information is wirelessly transmitted to the vehicle-side device 10. In the vehicle-side device 10, when the tracking request information is received from the ground-side device 20, feature amount data of an object to be tracked is specified from received image data specification information, second feature amount data whose difference from the feature amount data of the object to be tracked is within a second similarity range and corresponding to second image data newer than the first image data is retrieved from the feature amount data stored in the vehicle-side storing unit 12, and second image data corresponding to the second feature amount data is wirelessly transmitted to the ground-side device 20.

Although feature amount data of an object to be tracked is extracted from image data specification information in the central device 31 in the above description, feature amount data of an object to be tracked may be extracted in the NDR 32.

According to the third example, at least the following effects are produced.

(C1) When the number of persons captured in image data is one, as tracking request information specifying feature amount data of an object to be tracked, tracking request information including image data specification information can be used.

Obviously, the present invention is not limited to the foregoing embodiment but can be variously changed without departing from the gist.

In the embodiment, an example of the monitoring system of transmitting image data between a train and the ground has been described. However, the present invention is not limited to such a monitoring system but can be applied to a monitoring system in which image data is transmitted between an imaging-side device and a matching-side device.

Although the case of using image data specification information when the ground side requests image data was used as an example in the embodiment, the present invention is not limited to the case. A train side may transmit feature amount data without including image data specification information to the ground side and, when the ground side requests image data, transmit the feature amount data itself to designate image data. Also by the operation, operation effects similar to those of the foregoing embodiment can be obtained.

The present invention can be grasped not only as a system or device executing the processes according to the invention but also as a method. The present invention can be also grasped as a program for realizing such a method, a recording medium recording the program, and the like.

REFERENCE SINGS LIST

10: vehicle-side device (imaging-side device),
11: vehicle-side processing unit,
11*a*: feature amount extraction unit,
11*b*: selection unit,
11*c*: image data division unit,
11*d*: tracking unit,
12: vehicle-side storing unit,
12*a*: feature amount data,
12*b*: image data,
12*c*: camera number,
12*d*: recording time,
12*e*: train number,
12*f*: vehicle number,
12*g*: transmission time,
13: vehicle-side wireless unit,
14: imaging unit,
20: ground-side device (matching-side device), 21: ground-side processing unit,
21a: feature amount comparing unit,
21b: image data requesting unit,
21c: image data coupling unit,
21d: track requesting unit,
22: ground-side storing unit,
22a: feature amount reference data,
22b: image reference data,
22c: reception data,
23: ground-side wireless unit,
24: input/output unit,
31: central device,
32: NDR,
33: vehicular wireless device,
34: camera,
41: feature value management device,
43: ground wireless device,
44: terminal.

The invention claimed is:

1. A monitoring system comprising an imaging-side device generating image data and a matching-side device receiving the image data from the imaging-side device and matching the image data,
wherein the imaging-side device comprises:
an imaging unit imaging an object and generating image data of the object;
an imaging-side processing unit generating feature amount data indicating a feature of the object on the basis of the image data generated by the imaging unit;
an imaging-side storing unit storing the feature amount data and image data corresponding to the feature amount data so as to be associated with each other; and
an imaging-side wireless unit performing wireless communication with the matching-side device,
the matching-side device comprises:
a matching-side storing unit storing feature amount reference data to be compared with the feature amount data;
a matching-side processing unit comparing the feature amount data and the feature amount reference data; and
a matching-side wireless unit performing wireless communication with the imaging-side device,
the imaging-side device wirelessly transmits first feature amount data to the matching-side device,
when the first feature amount data is received, based on a result of comparison between the received first feature amount data and the feature amount reference data, the matching-side device wirelessly transmits image data request information requesting transmission of first image data corresponding to the first feature amount data, and
when the image data request information is received, the imaging-side device wirelessly transmits the first image data to the matching-side device.

2. The monitoring system according to claim 1, wherein when the difference between transmitted feature amount data which is wirelessly transmitted before the first feature amount data is wirelessly transmitted and the first feature amount data is not within a predetermined range or lapse time since the transmitted feature amount data is wireless transmitted to the matching-side device is not equal to or shorter than predetermined time, the imaging-side device wirelessly transmits the first feature amount data to the matching-side device and, when the difference between the transmitted feature amount data and the first feature amount data is within the predetermined range and the lapse time is equal to or less than the predetermined time, the imaging-side device does not wirelessly transmit the first feature amount data to the matching-side device.

3. The monitoring system according to claim 1, wherein the imaging-side device is mounted in a train, a plurality of imaging units exist and are disposed in a plurality of vehicles constructing the train,
when the difference between transmitted feature amount data which is wirelessly transmitted before the first feature amount data is wirelessly transmitted and the first feature amount data is in a predetermined range and lapse time since the transmitted feature amount data is wirelessly transmitted to the matching-side device is equal to or less than predetermined time, when a first vehicle in which an imaging unit which captured the first image data corresponding to the first feature amount data is disposed is the same as a second vehicle in which an imaging unit which captured image data corresponding to the transmitted feature amount data is disposed, the imaging-side device does not wirelessly transmit the first feature amount data to the matching-side device and, when the first and second vehicles are different from each other, the imaging-side device wirelessly transmits the first feature amount data to the matching-side device.

4. The monitoring system according to claim 1, wherein the matching-side device comprises an input/output unit having an input unit receiving an instruction from an operator and an output unit outputting various information, when the difference between the received first feature amount data and the feature amount reference data is within a first similarity range, the matching-side device outputs that the difference is within the first similarity range to the output unit, and when an image request from an operator is received by the input unit, the matching-side device wirelessly transmit the image data request information to the imaging-side device.

5. The monitoring system according to claim 1, wherein when the difference between the received first feature amount data and the feature amount reference data is in a first similarity range, the matching-side device automatically wirelessly transmits the image data request information to the imaging-side device.

6. The monitoring system according to claim 1, wherein the imaging-side device divides the first image data into a plurality of pieces and wirelessly transmits the divided data to the matching-side device, and
the matching-side device has a display unit displaying various information and, when the first image data is received, couples the received first image data and displays the resultant data in the display unit.

7. The monitoring system according to claim 1, wherein when a plurality of objects exist in one piece of image data,
the first feature amount data includes a plurality of pieces of feature amount data corresponding to the plurality of objects, and
when the first feature amount data is received, the matching-side device wirelessly transmits the image data request information to the imaging-side device on the basis of a result of comparison between any of the plurality of pieces of feature amount data included in the received first feature amount data and the feature amount reference data.

8. The monitoring system according to claim 7, wherein, before the first image data is wirelessly transmitted to the matching-side device, the imaging-side device puts a mark indicating similarity to an object corresponding to the first feature amount data, in the first image data.

9. The monitoring system according to claim 1, wherein feature amount data stored in the imaging-side storing unit includes feature amount data of the face of a person and feature amount data of clothes.

10. The monitoring system according to claim 1, wherein the imaging-side storing unit stores recording time indicating time when the image data is stored in association with the image data, the matching-side device comprises an input/output unit having an input unit receiving an instruction from an operator and an output unit displaying various information, when the difference between the received first feature amount data and the feature amount reference data is within a first similarity range, the matching-side device outputs that the difference is within the first similarity range to the output unit and, when a tracking request from the operator is received by the input unit after reception of the first image data, the matching-side device wirelessly transmits tracking request information specifying feature amount data of an object to be tracked to the imaging-side device, and when the tracking request information is received from the matching-side device, the imaging-side device extracts, from the feature amount data stored in the imaging-side storing unit, second feature amount data whose difference from the feature amount data of the object to be tracked is within a second similarity range and corresponding to second image data at recording time newer than that of the first image data, and wirelessly transmits second image data corresponding to the second feature amount data to the matching-side device.

11. The monitoring system according to claim 10, wherein the imaging-side device is mounted in a train, a plurality of imaging units exist and are disposed in a plurality of vehicles constructing the train, at the time of wirelessly transmitting the second image data, the imaging-side device wirelessly transmits a vehicle number specifying a vehicle in which an imaging unit generating the second image data is disposed to the matching-side device, after that, extracts, from feature amount data stored in the imaging-side storing unit, third feature amount data whose difference from feature amount data of the object to be tracked is within the second similarity range and corresponding to third image data at recording time newer than that of the second image data and, after wirelessly transmitting the second image data, wirelessly transmits third image data corresponding to the third feature amount data and vehicle number of a vehicle in which an imaging unit that generated the third image data is disposed to the matching-side device.

12. The monitoring system according to claim 10, wherein the second similarity range is narrower than the first similarity range.

13. The monitoring system according to claim 11, wherein an interval since the imaging-side device wirelessly transmits the second image data until the imaging-side device wirelessly transmits the third image data is shorter than an interval when the imaging-side device wirelessly transmits the first image data a plurality of times.

14. An imaging-side device comprising:

an imaging unit imaging an object and generating image data of the object;

an imaging-side processing unit generating feature amount data indicating a feature of the object on the basis of the image data;

an imaging-side storing unit storing the feature amount data and image data corresponding to the feature amount data so as to be associated with each other; and an imaging-side wireless unit performing wireless communication with a matching-side device and transmitting first feature amount data, wherein when the difference between transmitted feature amount data which is wirelessly transmitted before the first feature amount data is wirelessly transmitted and the first feature amount data is not within a predetermined range or an elapsed time since the transmitted feature amount data is wireless transmitted to the matching-side device is not within a predetermined time, the feature amount data is wirelessly transmitted to the matching-side device, wherein when the difference between the first feature amount data and the transmitted feature amount data is within the predetermined range and the elapsed time is within the predetermined time, the feature amount data is not wirelessly transmitted to the matching-side device, and wherein when image data request information requesting transmission of image data corresponding to the feature amount data is received from the matching-side device, image data corresponding to the feature amount data is wirelessly transmitted to the matching-side device.

15. A matching-side device comprising:

a matching-side storing unit storing feature amount reference data to be compared with feature amount data generated by an imaging-side device and indicating a feature of an object;

a matching-side processing unit comparing the feature amount data and the feature amount reference data; and a matching-side wireless unit performing wireless communication with the imaging-side device, wherein when the feature amount data is received from the imaging-side device, image data request information requesting transmission of image data is wirelessly transmitted to the imaging-side device based on a result of comparison between the received feature amount data and the feature amount reference data.

* * * * *